United States Patent [19]
Kirkbir et al.

[11] Patent Number: 5,473,826
[45] Date of Patent: Dec. 12, 1995

[54] PROCESS FOR DRYING SOL-GEL DERIVED POROUS BODIES AT ELEVATED SUBCRITICAL TEMPERATURES AND PRESSURES

[75] Inventors: Fikret Kirkbir, Los Angeles; Satyabrata Raychaudhuri, Agoura, both of Calif.

[73] Assignee: Yazaki Corporation, Tokyo, Japan

[21] Appl. No.: 292,878

[22] Filed: Aug. 19, 1994

[51] Int. Cl.⁶ ............................................. F26B 5/04
[52] U.S. Cl. ............................ 34/405; 34/92; 34/415
[58] Field of Search .................... 34/305, 78, 405, 34/413, 415, 92

[56] References Cited

U.S. PATENT DOCUMENTS

| | | | |
|---|---|---|---|
| 1,524,567 | 1/1925 | Plews | 34/405 |
| 3,290,790 | 12/1966 | Kunii et al. | |
| 3,672,833 | 6/1972 | Teichner et al. | |
| 4,851,150 | 7/1989 | Hench et al. | 252/315.6 |
| 5,023,208 | 6/1991 | Pope et al. | 501/12 |
| 5,243,769 | 9/1993 | Wang et al. | 34/27 |
| 5,254,508 | 10/1993 | Kirkbir et al. | 501/12 |
| 5,264,197 | 11/1993 | Wang et al. | 423/338 |
| 5,287,632 | 2/1994 | Heit et al. | 34/9 |
| 5,343,633 | 9/1994 | Wang et al. | 34/92 |
| 5,361,515 | 11/1994 | Peremyschev | 34/413 |

FOREIGN PATENT DOCUMENTS

| | | |
|---|---|---|
| 5007781 | 1/1993 | Japan. |

OTHER PUBLICATIONS

M. Yamane, "Monolith Formation from the Sol–Gel Process," *Sol–Gel Technology for Thin Films, Fibers, Performs, Electronics and Specialty Shapes*, edited by Lisa C. Klein, Noyes Publications, Chapter 10.

*Primary Examiner*—Denise L. Gromada
*Assistant Examiner*—Susanne C. Tinker
*Attorney, Agent, or Firm*—Pretty, Schroeder, Brueggemann & Clark

[57] ABSTRACT

A process is disclosed for drying sol-gel derived porous wet bodies without inducing cracks therein. The wet gel preferably is immersed in a liquid solvent before being placed inside a drying chamber capable of withstanding relatively high pressures and temperatures. After the wet gel is loaded, the chamber is sealed from the outside environment, and then is heated from outside the chamber in a controlled manner until a prescribed subcritical pressure is reached. The final temperature and pressure are always lower than the critical temperature and pressure of the drying solvent. The solvent vapor is then evacuated from the chamber in a controlled fashion to decrease the pressure until ambient pressure is reached, while preferably maintaining the temperature inside the chamber at the prescribed level. Thereafter, the inside of the chamber is purged with an inert gas for a prescribed time period, after which the chamber is cooled to ambient temperature and the dry crack-free porous gel is removed. The resulting dry gels are crack-free and monolithic.

21 Claims, No Drawings

PROCESS FOR DRYING SOL-GEL DERIVED POROUS BODIES AT ELEVATED SUBCRITICAL TEMPERATURES AND PRESSURES

BACKGROUND OF THE INVENTION

This invention relates to a sol-gel process for producing dry gel monoliths and, more particularly, to a drying process that provides a dry, crack-free porous gel monolith using elevated subcritical temperatures and pressures.

Sol-gel processes for fabricating high-purity monolithic articles of glass and ceramic are well known. In such processes, a desired solution, or "sol," consisting of glass- or ceramic-forming compounds, solvents, and catalysts is poured into a mold where it is allowed to react. Following hydrolysis and condensation reactions, the sol forms a porous matrix of solids, generally referred to as a "gel." With additional time, the gel shrinks in size as fluid is expelled from its pores. The wet gel is then dried in a controlled environment to remove the remaining fluid from its pores, after which it is densified into a solid monolith.

Sol-gel processes have many advantages, including, for example, chemical purity and homogeneity, flexibility in the selection of compositions, processing at relatively low temperatures, and producing monolithic articles close to their final desired shapes, thereby minimizing finishing costs. Nevertheless, sol-gel processes have generally proven to be difficult to use for producing large monoliths that are free of cracks. Typically, cracks arise during the final drying step of the process, and are believed to result from stresses due to capillary forces in the gel pores. Efforts to eliminate the cracking problem in sol-gel monoliths have been diverse. However, eliminating the cracking problem has also meant sacrificing one or more of the benefits of the process described above.

Known techniques for drying sol-gel derived bodies generally consist of one of two distinctly different approaches. In one approach, the wet gels are dried at ambient pressure (14.7 psia), and at temperatures close to or slightly higher than the boiling point of the solvent used as the drying medium. See, for example, Wang et al., U.S. Pat. No. 5,243,769, which describes just such a processing technique, and the disclosure of which is hereby incorporated by reference herein. One variation of this approach consists of heating the gel to such temperatures in a chamber having several pin holes through which the evaporating liquid escapes. Because the chamber is ventilated to the outside environment, the pressure does not increase above ambient pressure. Although this approach is generally effective, it can be very slow, at times requiring as much as a month or more to complete the drying process. While this slow drying rate can be increased by increasing the area of the pin holes, doing so frequently leads to cracking.

Other variations of this approach have been used in attempts to eliminate cracking during the final drying step. For example, colloidal silica particles have been added to the sol to increase the average pore size and strength of the solid matrix. Although this method is generally effective, the presence of colloidal silica particles sacrifices the gel's otherwise inherent homogeneity, thus restricting the range of compositions that can be utilized. In addition, devitrification spots can be created if mixing of the colloidal silica particles is not perfect. Drying control additives may also be added to the sol as this produces a more uniform pore size distribution, thereby strengthening the gel matrix. These additives, such as dimethyl formamide, are then removed during the drying step. Although generally effective in eliminating cracking, this method has the tendency to produce monoliths having a large number of bubbles. Using different catalysts can also increase the pore size distribution to aid in eliminating cracking during the drying step, but such a method has not proven to be particularly successful for large monoliths since no catalyst has yet been shown to be able to produce average pore sizes above about 100Å. One other variation of this approach has been to hydrothermally age the gel prior to drying. This increases the average pore size in the gel, and correspondingly decreases the capillary stresses encountered during drying. Although this method is generally effective, the aging step increases the time and the equipment costs for drying gels, and thus also increases the cost of the final product.

The second approach for drying sol-gel derived bodies to produce a dry gel monolith is to heat the wet gel above the critical temperature of the solvent being used as the drying medium in a drying chamber that permits the pressure to exceed the solvent's critical pressure. Because there is no vapor/liquid interface in the pores of the gel matrix when the temperature and pressure exceed the critical temperature and pressure of the drying solvent, no capillary force exists. The solvent is removed from the pores while the critical temperature and pressure is exceeded until a dry gel results. This technique is known in the art as "supercritical drying." Although this technique is effective, it requires relatively expensive equipment and can be dangerous.

Generally, sol-gels dried using ambient pressure techniques undergo considerable shrinkage, and the pore sizes of the resulting dry gels are usually relatively small. In contrast, sol-gels dried by high pressure supercritical drying techniques generally experience very little shrinking, which means that the resulting dry gels have relatively larger pore sizes.

Dry gels having larger pore sizes, i.e., having a pore radius of at least 40Å, are preferred for the manufacture of near net shape dense monolithic glass or ceramic objects by a sol-gel process. This is due to the fact that to produce dense glass monoliths, it is necessary to heat the porous dry gels to a temperature of at least 1200° C. to remove the pores. This process is known as "sintering." The sintering process usually consists of several sequential steps, such as the removal of physical water, decomposition of chemically bonded hydrocarbon groups by reaction with gaseous oxygen or air, removal of the products of the decomposition by purging with helium, and the final densification of the dried gel under a flow of helium. In a sintering process, it is important that the dry gel has sufficiently large pores so that the reactant gases, whether oxygen or air, purge gases such as helium, and other products of the reaction can pass in and out of the pores relatively easily without getting trapped in the porous gel matrix. For example, it is known that if a gel contains small pores, premature collapse of the pores may result at temperatures as low as 700° C., which is below the glass transition temperature of fused silica, generally about 1200° C. Premature collapse of small pores invariably traps gases. Any trapping or incomplete removal of residual hydrocarbon or hydroxyl groups will cause cracking during the sintering operation due to pressure build-up at higher temperatures. However, if a gel contains pores having a radius of at least 40Å, those pores generally remain open even at temperatures above 1200° C. See, "Monolith Formation from the Sol-Gel Process," M. Yamane, Chapter 10 of the book *Sol-Gel Technology for Thin Films, Fibers, Preforms, Electronics and Specialty Shapes*, edited by Lisa C. Klein, Noyes Publications, 1988. Thus, such larger pore sizes generally act as large diameter channels for the mass transfer of gases in and out of the gel matrix. The larger the pore size of the dry gel, the easier it is to sinter such gels to obtain crack-free monolithic glass pieces of any desired shape or size.

It is apparent from the foregoing discussion that supercritically dried gels, commonly known as "aerogels," should ideally be chosen for fabrication of dense sol-gel monoliths since this approach results in larger pore sizes. Although this is generally true, the supercritical drying process has one serious disadvantage in that it requires operation of an autoclave at higher pressures than the critical pressure of the solvents used as the drying medium. Most of the drying solvents used in a supercritical drying process have high critical pressures. For example, if ethyl alcohol is used as the drying solvent in a supercritical drying step, the supercritical temperature and pressure of operation are 243° C. and 928 psia, respectively. Thus, this type of high pressure operation requires the design and fabrication of specialty equipment. Such equipment can be prohibitively expensive for large scale manufacturing. However, the cost of the drying chamber can be reduced substantially if the operating pressure can be reduced below the critical pressure.

Inorganic solvents, such as liquid carbon dioxide, have also been used as the drying solvent in an attempt to avoid the above problems. However, the compression equipment necessary for liquefaction of gaseous carbon dioxide, and the cryogenic equipment necessary for maintaining carbon dioxide in the liquid state, are also very expensive. Consequently, inorganic solvents do not provide a commercially attractive alternative.

It should, therefore, be appreciated that there is a need for a process that will yield crack-free porous monoliths having a sufficiently large pore size for ease of sintering, and that can be carried out below the critical pressure of the drying solvent so that the equipment costs can be reduced to make the process commercially attractive. The present invention fulfills this need.

SUMMARY OF THE INVENTION

The present invention resides in a process for drying wet, porous gels to obtain glass or ceramic monoliths that are substantially free of cracks. As is well known in the art, a silica gel is formed by reacting tetraethyl orthosilicate (TEOS) with water in the presence of an acidic or basic catalyst. The solution is poured into a container of suitable size and shape. The solution gels to form a highly porous silica gel matrix in the shape of the container that has a high concentration of microscopic pores. The gel is aged inside the container, preferably at elevated temperatures to speed up the aging process, to initiate sufficient shrinkage away from the wall of the container for easy removal. The liquid inside the pores of the matrix is then exchanged with a preferably inert solvent used as the drying medium, such as ethyl alcohol, so that the pores of the gel are substantially filled with a pure solvent. This substantially terminates any further reaction between any remaining reactants.

After the solvent exchange step, the wet gel is dried by the process of the present invention, using elevated subcritical temperatures and pressures. The wet gel is placed inside a suitable drying chamber which can maintain pressures higher than ambient pressure by sealing it airtight to isolate it from the outside environment. In a preferred embodiment, before being placed in the drying chamber, the wet gel is immersed, and is preferably submerged, in a drying solvent contained in a suitable container. Preferably, the container is made of quartz or of a metal alloy material, such as stainless steel, grade 316. The solvent preferably has the same composition as the solvent in the pores after the solvent exchange step, e.g., ethyl alcohol. After the chamber is sealed, the temperature inside the chamber is controllably raised at a prescribed rate to a temperature below the critical temperature of the solvent, preferably at least 10° C. below. To avoid cracking the gel, the temperature is generally raised at a rate of from about 2° to about 10° C. per hour, preferably from about 2° to about 5° C. per hour. As the temperature inside the chamber increases, the solvent in the pores of the wet gel and, if present, in the container in which the wet gel has been placed, begins to evaporate. As the evaporation of the solvent increases, the pressure inside the drying chamber also increases. The final pressure inside the drying chamber depends upon the total volume of solvent from inside the gel pores and, if present, from the container in which the gel has been submerged or immersed, and the internal volume of the selected drying chamber. Therefore, controlling the amount of solvent present in a selected drying chamber of known volume insures that the solvent's critical pressure will not be exceeded.

Once all of the solvent has vaporized, the pressure inside the drying chamber reaches a substantially constant level, which is below the critical pressure of the solvent, even though the temperature may continue to increase. This indicates that all of the solvent present inside the drying chamber, including that in the pores of the gel body and in the container in which the gel is immersed or submerged, if present, has fully vaporized, and the gel body is dry. The temperature is controllably raised until the pressure reaches a substantially constant value, with the final temperature inside the drying chamber always remaining below the solvent's critical temperature. Consequently, the gel dries in the presence of a vapor/liquid interphase in the pores of the gel matrix, which means that capillary stresses are always present during the drying process.

Once the pressure inside the drying chamber reaches a substantially constant pressure, the gel is dry, and the vapor is evacuated from the chamber in a controlled fashion until the pressure reaches ambient pressure (14.7 psia). Importantly, the temperature is preferably maintained constant at a temperature below the critical temperature during the evacuation step. Thereafter, the drying chamber is purged with an inert gas, such as nitrogen, to remove the last traces of solvent vapor, and the dried gel is then allowed to cool to ambient temperature, after which the chamber is opened and the dry monolithic gel is removed.

The present invention has the particular advantage that the pressure inside the drying chamber can be controlled by varying the total amount of solvent inside the drying chamber, or changing the volume of the chamber, or both. Since the shrinkage of the wet gel during drying, and the resulting pore radius of the dry gel monolith, depends upon the pressure in the drying chamber during drying, the present invention provides a process for controlling the shrinkage and pore diameter of the dry gel body over a wide range by maintaining the pressure at different preselected levels.

DESCRIPTION OF THE PREFERRED PROCESS

Wet gels dried to form glass or ceramic monoliths in accordance with the process of the present invention form monoliths that are free of cracks. The drying process is carried out in a drying chamber under elevated subcritical temperatures and pressures of the drying solvent in the pores of the wet gel.

Wet gels of various shapes are formed by mixing a suitable alkoxide precursor with an alcohol, deionized water, and a suitable catalyst in predetermined proportions. With specific reference to a silica monolith, tetraethyl orthosilicate (TEOS) is mixed with ethanol, deionized water, and a catalyst such as hydrofluoric acid (HF) or a mixture of HF and hydrochloric acid (HCl) to form a sol as is well known in the art. It is important that the pristine strength of the wet gel is sufficient to withstand the capillary stresses generated during the drying process, and techniques to prepare sols that will produce such wet gels are described in Wang et al., U.S. Pat. No. 5,264,197, the disclosure of which is hereby incorporated by reference herein.

The sol is poured into a suitable container, such as a cylindrical mold, for gelling, which usually occurs within 4–6 hours, depending upon the sol composition and the type of catalyst used. Typically, the gel is then aged at an elevated temperature below the boiling point of the alcohol, preferably for about a week, by which time the gel generally undergoes substantial shrinkage away from the wall of the mold, thereby facilitating its easy removal. After the wet gel is removed from the mold, it is preferably submerged in a container containing a drying solvent to be exchanged by diffusion with the fluid in the pores of the gel. Suitable solvents include ethyl alcohol, iso-butanol, 2-pentanol, and 2,2,4-trimethylpentane. Preferably, the solvent to be exchanged for the fluid in the pores is inert so as to substantially terminate any further reaction between the reactants. The exchange of the liquid in the pores of the gel matrix with the drying solvent may be repeated several times, using the same solvent, to replace substantially all of the fluid in the pores. If desired, the temperature of the solvent may be increased to increase the diffusion rate, but care must be taken to avoid evaporating the solvent. After the drying solvent has replaced substantially all of the fluid in the pores, the wet gel is dried using the process of the present invention as described in detail below.

After the solvent exchange step, the wet gel is placed inside a drying chamber which can maintain pressures higher than ambient pressure by sealing it airtight to isolate it from the outside environment. Suitable general purpose pressure vessels are well known in the art, such as, for example, the vertical pressure vessel model no. N4668 which is available from Parr Instrument Company in Moline, Ill. In a preferred embodiment, before being placed in the drying chamber the wet gel is immersed, and preferably is submerged, in a solvent contained in a suitable container. Preferably, the container is made of quartz or a metal alloy material, such as stainless steel, grade 316. The solvent preferably has the same composition as the fluid in the pores, e.g., ethyl alcohol, although it theoretically need not be the identical solvent. Other suitable solvents include iso-butanol, 2-pentanol, and 2,2,4-trimethylpentane.

After the wet gel is placed inside the drying chamber, the chamber is sealed from the outside environment. The temperature inside the chamber is then controllably increased by heating the chamber from the outside by a suitable heating means well known in the art, such as a furnace heater having a programmable temperature control. To avoid cracking the wet gel, preferably the temperature inside the chamber increases at a rate of from about 2° to about 10° C. per hour, more preferably from about 2° to about 5° C. per hour. The temperature inside the chamber continues to increase until it reaches a preselected temperature preferably at least 10° below the critical temperature of the solvent. As the temperature increases, the solvent in the pores of the wet gel and, if present, in the container in which the wet gel has been placed, begins to evaporate. As the evaporation of the solvent increases, the pressure inside the drying chamber also increases. The final pressure inside the drying chamber depends upon the total volume of solvent from inside the gel pores and, if present, from the container in which the gel has been submerged or immersed, and the internal volume of the selected drying chamber. Preferably, an amount of solvent is used that, for a selected drying chamber of known volume, will insure that the final pressure is at least 10 psia below the drying solvent's critical pressure.

Once all of the solvent has vaporized, the pressure inside the drying chamber reaches a substantially constant level, which is below the critical pressure of the solvent, even though the temperature may continue to increase. This indicates that all of the solvent present inside the drying chamber, including that from the pores of the gel body and from the container in which the gel is immersed or submerged, if present, has fully vaporized, and the gel body is dry. The temperature is controllably increased until the pressure reaches a substantially constant value, with the final temperature inside the drying chambers always remaining below the solvent's critical temperature. Consequently, the gel dries in the presence of a vapor/liquid interphase in the pores of the gel matrix, and capillary stresses are always present during the drying process.

Once the pressure inside the drying chamber reaches a substantially constant pressure, the gel is dry, and the vapor is evacuated from the chamber in a controlled fashion until the pressure reaches ambient pressure (14.7 psia). To avoid a quick pressure drop, the shock of which could cause the dry gel to crack, the pressure should be reduced slowly, preferably at a rate of about 50 psia to about 80 psia per hour. Importantly, the temperature is preferably maintained constant at a temperature below the critical temperature during the evacuation step. Thereafter, the drying chamber is purged with an inert gas to remove the last traces of solvent vapor. While any inert gas may be used, nitrogen is preferred. When nitrogen is used, the chamber is preferably purged for at least 10–15 minutes. The dried gel is then allowed to cool to ambient temperature, after which the chamber is opened and the dry monolithic gel is removed.

The process of the present invention has the particular advantage that the pressure inside the drying chamber can be controlled by varying the total amount of solvent inside the drying chamber, or by changing the volume of the chamber, or both. By maintaining the pressure at a particular preselected level below the critical pressure of the solvent, the present invention controls the shrinkage and pore diameter of the dry gel body. Thus, the process of the present invention avoids the formation of cracks in the monolith during the drying step which are caused by capillary forces of the solvent in the pores of the wet gel matrix by drying the wet gel at elevated subcritical temperatures and pressures. This allows the shrinkage of the wet gel to be controlled as it dries so that the pore diameter remains relatively large for ease of sintering.

In order to more fully and clearly describe the present invention so that those skilled in the art may better understand how to practice the present invention, the following examples are given. These examples are intended to illustrate rather than limit the invention disclosed and claimed herein. In particular, the above and other features of the present invention should become apparent, and the process of the present invention should be better understood, with reference to the following illustrative examples:

EXAMPLE 1

A sol was prepared by mixing 124.05 grams of TEOS, 81.23 grams of ethanol, 42.85 grams of deionized water, 1.17 grams of hydrochloric acid (HCl), and 0.71 gram of hydrofluoric acid (HF). The sol was poured into a cylindrical mold of 250 cc volume. The solution gelled within the mold in 24 hours. The gel was aged at 70° C. for seven days. The gel was removed from the mold and immersed in ethyl alcohol for another seven days to exchange the fluid in the pores of the gel matrix with ethyl alcohol. The wet gel was then transferred inside a glass cylinder and submerged in fresh ethyl alcohol. The glass cylinder containing the wet gel was placed inside a drying chamber. The total amount of solvent present inside the drying chamber was 1,085 grams, and the internal volume of the vertical pressure vessel model no. N4668 from Parr Instrument Company was 19.25 liters. The chamber was sealed airtight to isolate it from the outside environment. The temperature of the chamber was raised by heating it from outside the chamber to a temperature of 233° C. at a rate of about 2° C. per hour. The pressure inside the chamber also increased as the temperature increased, until it reached 640 psia, after which it remained constant. Because the critical temperature and pressure of ethyl alcohol are 243° C. and 928 psia, respectively, this experiment was conducted under subcritical conditions of the pore liquid. After reaching the constant pressure level of 640 psia, the drying chamber was depressurized in a controlled fashion at a rate of about 50 psia to bring the pressure down to 14.7 psia (ambient pressure), while maintaining the temperature constant at 233° C. The chamber was then purged for about 15 minutes with gaseous nitrogen. Thereafter, the chamber was cooled to room temperature, opened, and a dry crack-free monolithic gel was removed. The dry gel had an average pore radius of 47Å and the linear shrinkage of the gel during the drying operation was only 8%.

EXAMPLE 2

A gel was prepared exactly the same way as in Example 1 except that the pore fluid in the gel was exchanged with iso-butanol during the solvent exchange step. The wet gel was submerged in fresh iso-butanol inside a glass cylinder before being transferred into the drying chamber. The total amount of solvent present inside the drying chamber was 1,351 grams, and the internal volume of the vertical pressure vessel model No. N4668 from Parr Instrument Company was 19.25 liters. The temperature of the chamber was raised slowly to 255° C. at a rate of about 2° C. per hour. The pressure inside the chamber also slowly increased to 380 psia, after which it remained constant. As the critical temperature and pressure for iso-butanol are 265° C. and 705.6 psia, respectively, this experiment was also conducted under subcritical conditions of the pore liquid. After depressurization, nitrogen purge, and cooling as described in Example 1, the drying chamber was opened and a dry crack-free monolithic gel was removed. The average pore radius of the dry gel was 76Å and the linear shrinkage during the drying operation was 2%.

EXAMPLE 3

A gel was prepared exactly the same way as in Example 1 except that the pore fluid in the gel was exchanged with 2-pentanol during the solvent exchange step. The wet gel was submerged in fresh 2-pentanol inside a glass cylinder before being transferred into the drying chamber. The total amount of solvent present inside the drying chamber was 1,162 grams, and the internal volume of the vertical pressure vessel model No. N4668 from Parr Instrument Company was 19.25 liters. The temperature of the chamber was raised slowly to 254° C. at a rate of about 2° C. per hour. The pressure inside the chamber also increased slowly to 268 psia, after which it remained constant. The estimated critical temperature and pressure for 2-pentanol are 279° C. and 559 psia, respectively. This experiment was, therefore, conducted under subcritical conditions of the pore liquid. After depressurization, nitrogen purge and cooling as described in Example 1, the drying chamber was opened and a dry crack-free monolithic gel was removed. The pore radius of the dry gel was 70Å and the linear shrinkage during the drying operation was 2%.

EXAMPLE 4

A gel was prepared exactly the same way as in Example 1 except that the pore fluid in the gel was exchanged with 2,2,4-trimethylpentane during the solvent exchange step. The wet gel was submerged in fresh 2,2,4-trimethylpentane inside a glass cylinder before being transferred into the drying chamber. The total amount of solvent present inside the drying chamber was 1,010 grams, and the internal volume of the vertical pressure vessel model No. N4668 from Parr Instrument Company was 19.25 liters. The temperature of the chamber was raised slowly to 250° C. at a rate of about 2° C. per hour. The pressure inside the chamber also increased slowly to 264 psia, after which it remained constant. The estimated critical temperature and pressure for 2,2,4-trimethylpentane are 271° C. and 372 psia, respectively. This experiment was, therefore, conducted under subcritical conditions of the pore liquid. After depressurization, nitrogen purge and cooling as described in Example 1, the drying chamber was opened and a dry crack-free monolithic gel was removed. The pore radius of the dry gel was 70Å and the linear shrinkage during the drying operation was 2%.

Other modifications and variations of the present invention are possible in light of the above teachings. For example, alternate solvents may be chosen as the drying medium so that lower pressures may be used. The gels may also be dried inside the chamber without submerging or otherwise immersing them in the drying medium, provided that the amount of the solvent in the pores of the wet gel is sufficient to raise the pressure to the desired levels as the temperature increases. It is to be understood, however, that changes may be made in the particular embodiments described above which are within the full intended scope of the invention as defined in the claims. Accordingly, the present invention is defined only with reference to the following claims.

What is claimed is:

1. A process for drying a wet, porous gel having a matrix that carries a liquid in its pores, comprising:

immersing the gel in a drying solvent having substantially the same composition as the liquid in the pores;

placing the gel, immersed in the drying solvent, inside a sealable pressure chamber;

sealing the pressure chamber;

heating the sealed pressure chamber to a temperature below the critical temperatures of the drying solvent and the liquid in the pores, without introducing a separate fluid into the chamber, such that the drying solvent and the liquid in the pores both vaporize, causing an increased pressure inside the pressure chamber that reaches a substantially constant level, below the critical pressure of the drying solvent and the liquid in the pores;

releasing the vapor from the pressure chamber;

purging the pressure chamber;

cooling the gel; and unsealing the pressure chamber and removing the gel from the pressure chamber.

2. The process of claim 1 wherein the step of releasing the vapor from the pressure chamber is accomplished while maintaining a constant temperature inside the pressure chamber.

3. The process of claim 2 wherein the step of purging the pressure chamber uses an inert gas for at least ten minutes of purging.

4. The process of claim 3 wherein the inert gas is nitrogen.

5. The process of claim 1 wherein the cooling step includes lowering the temperature inside the pressure chamber to an ambient temperature before the step of removing the gel occurs.

6. The process of claim 1 wherein both the drying solvent and the liquid in the pores consist essentially of ethyl alcohol.

7. The process of claim 1 wherein both the drying solvent and the liquid in the pores consist essentially of iso-butanol.

8. The process of claim 1 wherein both the drying solvent and the liquid in the pores consist essentially of 2-pentanol.

9. The process of claim 1 wherein both the drying solvent and the liquid in the pores consist essentially of 2,2,4-trimethylpentane.

10. The process of claim 1 wherein the pressure chamber is heated at a rate of from about 2° to about 10° C. per hour.

11. A process for drying a wet, porous gel having a matrix that carries a liquid in its pores, comprising:

placing the gel inside a sealable pressure chamber;

sealing the pressure chamber;

heating the sealed pressure chamber to a temperature below the critical temperature of the liquid, without introducing a separate fluid into the chamber, until substantially all of the liquid inside the pressure chamber and inside the pores of the gel matrix vaporizes, causing an increased pressure inside the pressure chamber that is above an ambient pressure but below the critical pressure of the liquid;

releasing the vapor from the pressure chamber until the pressure inside the pressure chamber reaches the ambient pressure;

purging the pressure chamber with an inert gas;

cooling the pressure chamber until the gel reaches an ambient temperature; and removing the cooled gel from the pressure chamber.

12. The process of claim 11 wherein the step of heating the pressure chamber includes increasing the temperature inside the pressure chamber after substantially all of the liquid has been vaporized and the pressure inside the pressure chamber has reached a substantially constant value.

13. The process of claim 12 wherein the step of releasing the pressure chamber is accomplished while maintaining a constant temperature inside the pressure chamber.

14. The process of claim 11 wherein the step of purging the pressure chamber uses the inert gas for at least ten minutes of purging.

15. The process of claim 14 wherein the inert gas is nitrogen.

16. The process of claim 11 wherein the liquid consists essentially of ethyl alcohol.

17. The process of claim 11 wherein the liquid consists essentially of iso-butanol.

18. The process of claim 11 wherein the liquid consists essentially of 2-pentanol.

19. The process of claim 11 wherein the liquid consists essentially of 2,2,4-trimethylpentane.

20. A process for drying a wet, porous gel having a matrix that carries a liquid in its pores, comprising:

placing the gel in a container containing a drying solvent that is substantially the same as the liquid in the pores;

placing the container inside a sealable pressure chamber;

sealing the pressure chamber;

increasing the temperature inside the sealed pressure chamber at a rate of from about 2° to about 10° C. per hour to a temperature below the critical temperature of the liquid until substantially all of the liquid vaporizes, causing an increased pressure inside the pressure chamber that reaches a substantially constant level above an ambient pressure but below the critical pressure of the liquid;

releasing the vapor from the pressure chamber while maintaining a constant temperature inside the pressure chamber until the pressure inside the pressure chamber reaches the ambient pressure;

purging the pressure chamber with an inert gas for at least ten minutes;

cooling the pressure chamber until the gel reaches an ambient temperature; and removing the cooled gel from the pressure chamber.

21. The process of claim 20 wherein after the pressure inside the pressure chamber reaches a constant level, the temperature inside the pressure chamber is further increased.

* * * * *